March 28, 1967 S. TAMNY 3,310,825
QUICK CHANGE SWEEPER BROOM
Filed Feb. 4, 1965 3 Sheets-Sheet 1
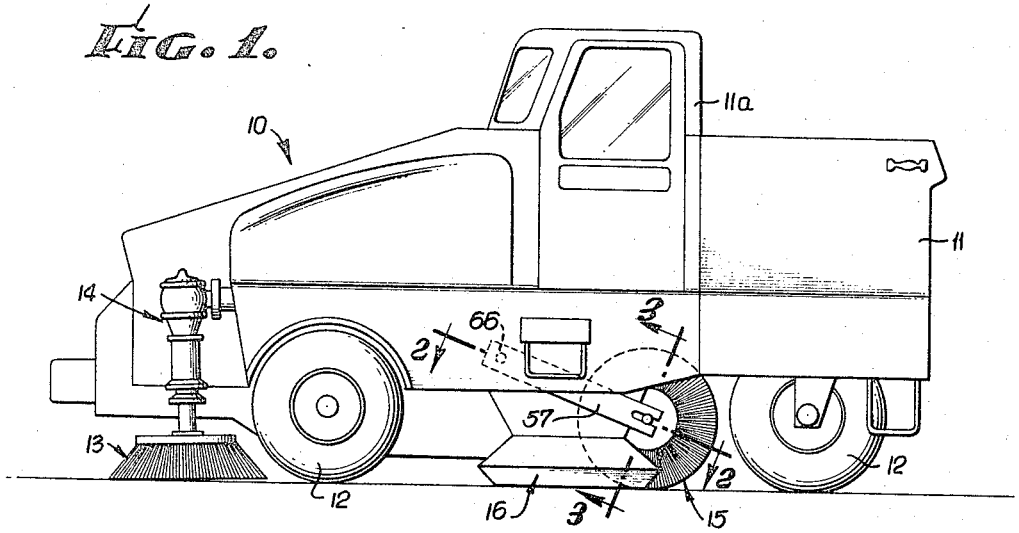
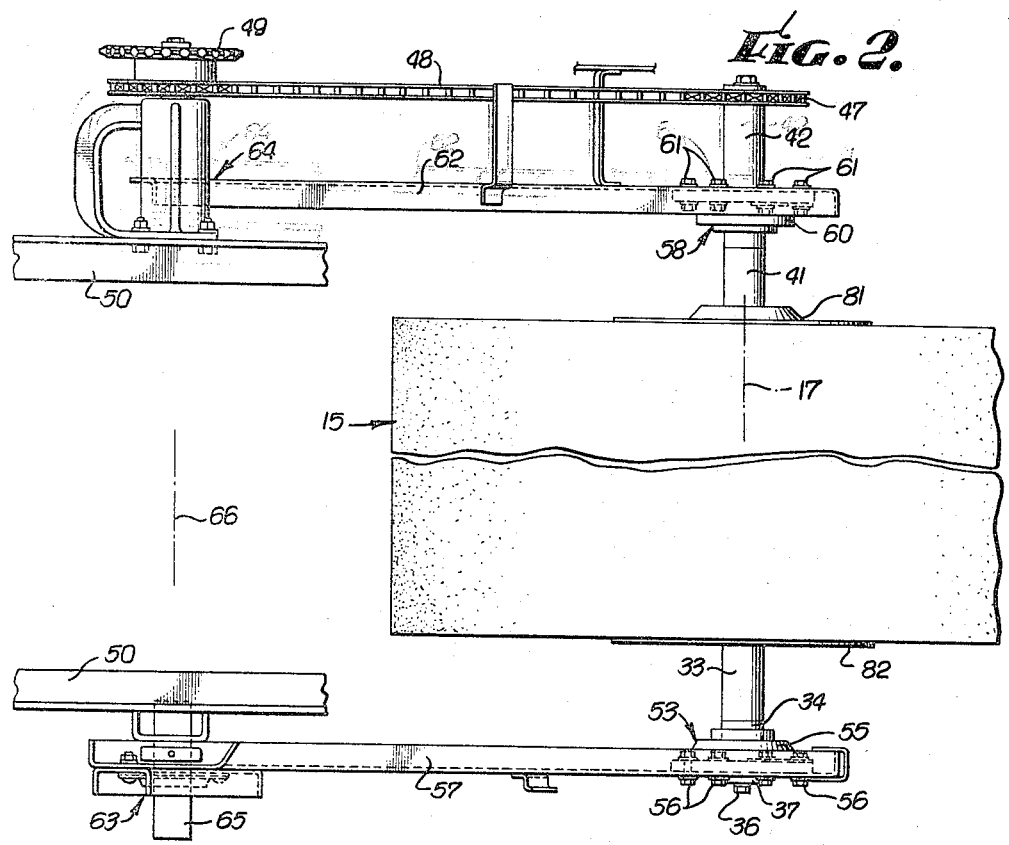
INVENTOR.
SIMON TAMNY
by White & Haefliger
ATTORNEYS.

March 28, 1967     S. TAMNY     3,310,825
QUICK CHANGE SWEEPER BROOM
Filed Feb. 4, 1965     3 Sheets-Sheet 2
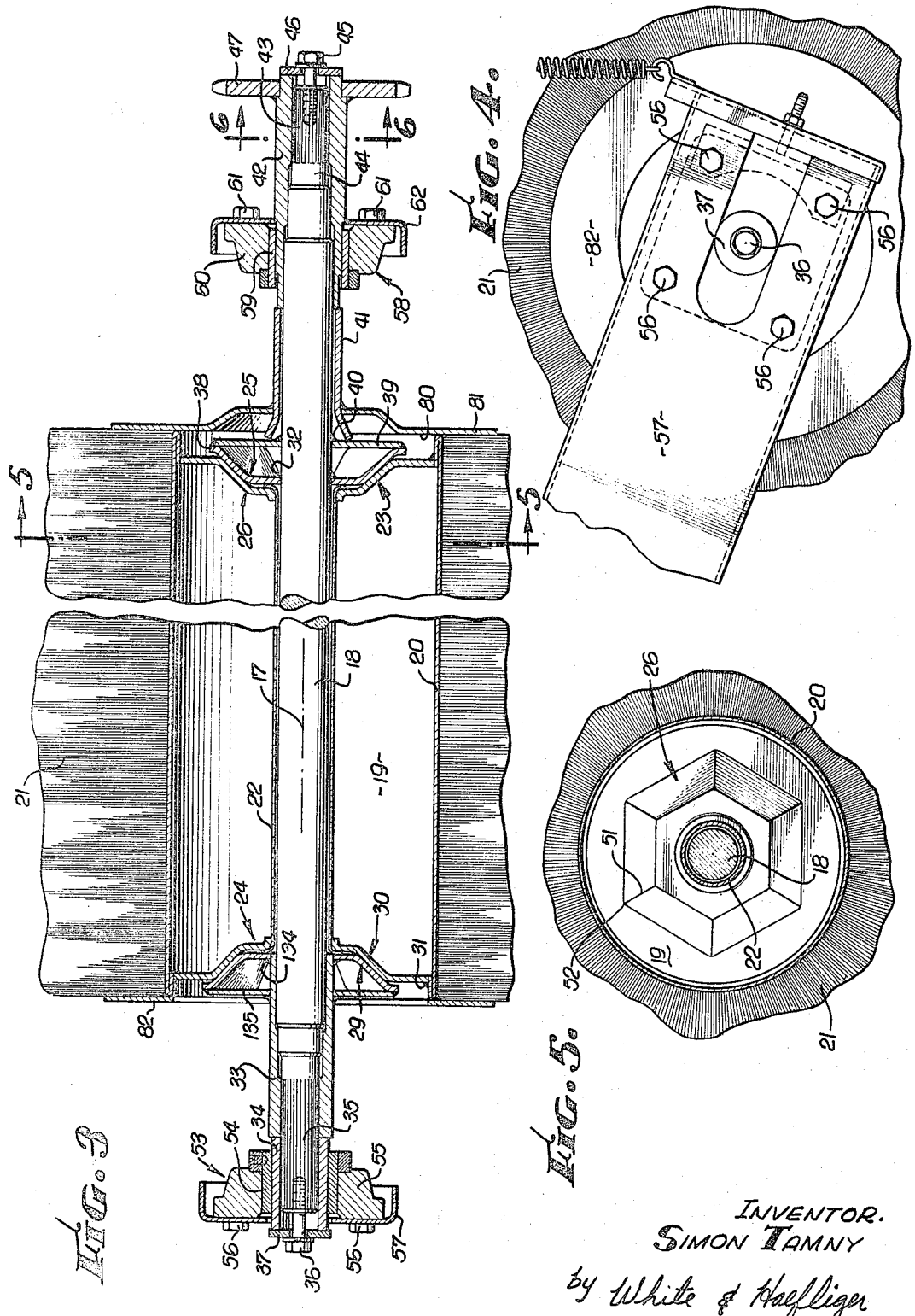
INVENTOR.
SIMON TAMNY
by White & Haefliger
ATTORNEYS.

March 28, 1967 S. TAMNY 3,310,825
QUICK CHANGE SWEEPER BROOM
Filed Feb. 4, 1965 3 Sheets-Sheet 3
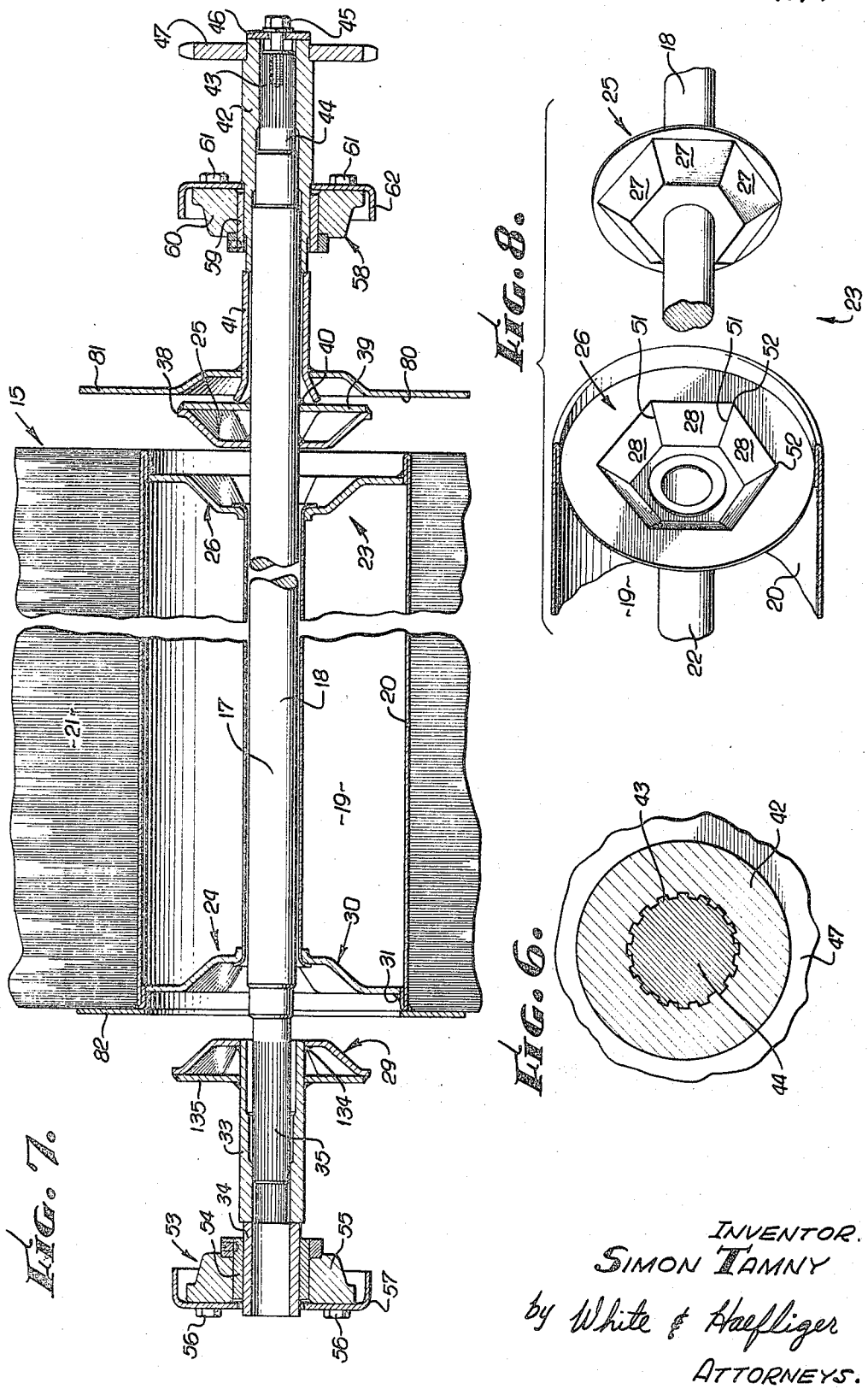
INVENTOR.
SIMON TAMNY
by White & Haefliger
ATTORNEYS.

United States Patent Office 3,310,825
Patented Mar. 28, 1967

3,310,825
QUICK CHANGE SWEEPER BROOM
Simon Tamny, Los Angeles, Calif., assignor to Wayne Manufacturing Company, Pomona, Calif., a corporation of California
Filed Feb. 4, 1965, Ser. No. 430,317
14 Claims. (Cl. 15—82)

This invention relates generally to power sweeper equipment, and more particularly concerns improvements in rotary drives as particularly adapted to rotary pickup brooms used by power sweepers.

Disadvantages associated with prior rotary pickup broom drives include the complexity of prior drives, the difficulty of removing an old broom and replacing same imposed by the necessity of disassembling and removing complex prior drives, and the lack of a simple means functioning not only to rotate the broom, but also to support the broom against radial, rotary and axial displacement relative to a drive axle.

The present invention has for its major object the elimination of the above mentioned disadvantages, as well as others, associated with prior rotary drives, particularly as used in power sweepers and in connection with pickup brooms. Basically, as used in combination with a rotary broom in a power driven street sweeper, the invention contemplates the provision of means for mounting and driving the broom in rotation and including nesting bodies having driving and driven surfaces mutually interengaged along planes defined by the surfaces of a regular pyramid, one body providing said driven surfaces being integral with the broom to rotate therewith and another body providing said drive surfaces, the bodies furthermore being relatively separable out of nesting relation to permit rapid demounting of the broom.

More specifically, the body providing the drive surfaces is rotatable by the axle; the broom is typically generally annular and the axle passes generally coaxially through the broom with the mentioned bodies supporting the broom against rotary, radial and axial dispalcement relative to the axle; the body driving and driven surfaces typically extend within a central hollow defined by the broom assemblies and with driven surfaces defining planes having intersections which terminate outwardly proximate the outer boundary of the hollow.

The invention also contemplates the provision of means for mounting and driving the broom in rotation and including the broom supporting axle and two axially spaced pairs of nesting bodies, each pair of bodies constructed as described and located so that the drive bodies nest into the driven bodies, the drive bodies being relatively separable axially away from each other and out of nesting relation with the driven bodies to permit rapid endwise removal of the broom assembly off the axle. Further, one drive body is typically mounted on a sleeve having driven connection to the axle and being blocked against such axial displacement on the axle as would tend to separate the one driving body from the driven body having nesting relation therewith. Also, the axle has protrusions from opposite ends of the broom hollow so as to be supported by bearing assemblies carried by arms pivotally supported by sweeper frame structure as will be described, the overall construction being such as to facilitate the broom driving, mounting, removal and replacement functions in a novel and unusually advantageous manner.

These and other objects and advantages of the invention, as well as the details of illustrative embodiments, will be more fully understood from the following detailed description of the drawings in which:

FIG. 1 is a side elevation showing a sweeping vehicle embodying the invention;

FIG. 2 is an enlarged plan view taken on line 2—2 of FIG. 1;

FIG. 3 is an enlarged section taken on line 3—3 of FIG. 1;

FIG. 4 is a fragmentary side elevation showing the details of pivoted arm support of a rotary pickup broom;

FIG. 5 is a fragmentary section taken on line 5—5 of FIG. 3;

FIG. 6 is an enlarged fragmentary section taken on line 6—6 of FIG. 3;

FIG. 7 is a view like FIG. 3 but showing the driving and driven bodies axially separated, i.e. during demounting of the broom from the axle; and FIG. 8 is an exploded perspective showing of typical driving and driven bodies incorporating the invention.

Referring first to FIG. 1, a power driven street sweeper is indicated at 10 as including a body 11 supported by wheels 12. A power unit contained within the body drives a gutter broom 13 as by means of the drive 14, power also being transmitted to the rotary pickup broom 15 located beneath the cab 11a of the vehicle. Broom 15 may be driven clockwise in FIG. 1 to sweep debris into the collection mechanism 16.

Extending the description to FIGS. 2, 3 and 7, the broom 15 is generally annular and defines a central axis 17 along which a broom supporting axle 18 extends in coaxial relation with the broom. More particularly, the axle passes through a central hollow 19 defined by the broom annulus, the hollow being located inwardly of a cylindrical body 20 about which the broom bristles 21 are carried to project radially outwardly. The broom assembly also includes a central tube 22 extending coaxially within the hollow 19.

In accordance with the invention means is provided for mounting and driving the broom in rotation and including nesting bodies having driving and driven surfaces mutually interengaging along planes defined by the surfaces of a regular pyramid, one body providing the driven surfaces being integral with the broom to rotate therewith and another body providing the drive surfaces, the bodies being relatively separable out of nesting relation to permit rapid demounting of the broom.

One such means incorporating the invention is shown in the drawings to include two pairs 23 and 24 of nesting bodies located within the central hollow 19 defined by the broom annulus. Pair 23 includes driving and driven bodies 25 and 26 respectively, the bodies having driving and driven surfaces mutually interengaged along planes defined by the surfaces of a regular pyramid whose principal axis extends coaxially with the axle. FIG. 8 shows body 25 having drive surfaces 27 as defined to interengage the driven surfaces 28 of body 26. The same relationships exists with the pair of bodies 24, excepting that the pair 24 is axially spaced from the pair 23, and also excepting that the drive body 29 of the pair 24 is separable from the driven body 30 of the same pair in a direction away from the drive body 25, as is better indicated in FIG. 7, this relationship permitting rapid endwise removal of the broom assembly off the axle as will further appear.

The driven bodies 26 and 30 are seen as integral with the broom assembly, and particularly with the cylinder 20, a suitable weld attachment for this purpose being indicated at 31. On the other hand, the drive bodies 29 and 25 are rotatable by the axle 18, body 25 typically being attached to the axle as by welding indicated at 32. Drive body 29 has driven attachment to the axle 18 through a sleeve 33 to which body 29 is attached at 134 and also by plate 135. When the broom and the drive therefor are made up as indicated in FIG. 3, the sleeve 33 is blocked against such axial displacement on the axle 18 as would tend to separate the drive body 29 from the driven body 30 having nesting relation therewith. At the same time, the endwise stacking of the broom assembly and the drive is such as to maintain bodies 25 and 26 in fully nested relation. In this regard, the sleeve 33 is maintained in the position shown in FIG. 3 by a hub 34 on the axle protrusion 35 which is splined, and by the screw 36 threadably attached to the axle and urging the washer 37 against the terminal of the hub 34. While the body 25 is attached to the axle at 32, its outer periphery 38 is blocked against rightward deflection in FIG. 3 by a plate 39 attached at 40 to the axle, and also having a tubular spacer 41 bearing against the rightward face of the plate. The spacer 41 is located on the axle by a hub 42 having spline attachment at 43 to the axle protrusion 44. A screw 45 attached to the terminal of the axle acts through a washer 46 to hold the hub 42 in position. Drive is transmitted to the hub 42 as by a sprocket 47, drive chain 48 and suitable power take off 49 carried by the frame 50.

It will be noted in FIGS. 5 and 8 that the adjacent driven surfaces 28 on the driven body 26 define planes having intersections 51 which terminate outwardly at 52 proximate the outer boundary of the hollow 19, this construction resulting in near optimum conditions of torque transmission from the drive body 25 to the driven body 26 within the space afforded by the size of the hollow 19. It will also be noted that the pairs 23 and 24 of drive and driven bodies, constructed and assembled as illustrated, provide for support of the broom against radial, rotary and axial displacement relative to the axle, whereby the broom may be vary easily mounted and demounted with respect to the axle.

Returning to FIGS. 3 and 7, the hub 34 is centered within a bearing assembly 53 which includes a bearing sleeve 54 and a bearing block 55, the latter being releasably attached as by cap screws 56 to an arm 57. Likewise, at the opposite end of the axle the hub 42 is centered by a bearing assembly 58 that includes a bearing sleeve 59 and block 60, the latter releasably attached as by cap screws 61 to an arm 62. The arms 57 and 62 project rearwardly and downwardly as shown in FIG. 1, and are supported at 63 and 64 to rotate about suitable pivots, one of which is seen at 65, and defining a pivot axis 66. The latter extends horizontally and transversely with respect to the forward direction of vehicle travel, whereby the arms 57 and 62 pivot generally up and down along with the broom, axis 66 being parallel to but offset from the axle.

The suport 63 includes a self-aligning bearing allowing arm 57 to be swung out or away from the splined axle protrusion 35. Accordingly, after removal of screw 36 and washer 37 the hub 34 together with the bearing assembly 53 on arm 57 may be removed from the axle protrusion and the sleeve 33 may then be removed to allow rapid leftward demounting of the broom, the partially demounted condition of FIG. 7 illustrating the manner of this operation.

Examination of FIGS. 3 and 7 will also show how the broom assembly may be mounted on the axle. In this regard, the broom itself is made up to the surface 80 of the large plate 81 carried by the spacer 41, at which time the pair of bodies 25 and 26 becomes fully nested. Plate 81 thus maintains the bristles in endwise gathered condition upon the shell or cylinder 20. An opposite plate 82 carried by the shell holds the bristles at the opposite or leftward end of the broom as indicated.

I claim:

1. For combination in a power driven sweeper, a rotary broom, and means for mounting and driving the broom in rotation and including nesting bodies having driving and driven surfaces mutually interengaged along planes defined by the surfaces of a regular pyramid, one body providing said driven surfaces being integral with the broom to rotate therewith and another body providing said drive surfaces, said bodies being relatively separable out of nesting relation to permit rapid demounting of the broom.

2. For combination in a power driven sweeper, a rotary broom assembly, and means for mounting and driving the broom in rotation and including a broom supporting axle and nesting bodies having driving and driven surfaces mutually interengaged along planes defined by the surfaces of a regular pyramid whose principal axis extends coaxially with said axle, one body providing said driven surfaces and being integral with the broom to rotate therewith and another body providing said drive surfaces and being rotatable by the axle, said bodies being relatively separable out of nesting relation to permit rapid demounting of the broom.

3. The combination of claim 2 in which the broom is generally annular and defines a central axis, the axle passes generally coaxially through the broom, and said bodies support the broom against radial, rotary and axial displacement relative to the axle.

4. The combination of claim 3 in which said body driving and driven surfaces extend within a central hollow defined by the broom annulus.

5. The combination of claim 4 in which adjacent driven surfaces define planes having intersections which terminate outwardly proximate the outer boundary of said hollow.

6. For combination in a power driven sweeper, a rotary broom assembly, and means for mounting and driving the broom in rotation and including a broom supporting axle and two pairs of nesting bodies each pair of bodies having driving and driven surfaces mutually interengaged along planes defined by the surfaces of a regular pyramid whose principal axis extends coaxially with said axle a driven body of each pair providing said driven surfaces and being integral with the broom to rotate therewith and a drive body of each pair providing said drive surfaces and being rotatable by the axle the drive bodies nesting into the driven bodies and being relatively separable axially away from each other and out of nesting relation with the driven bodies to permit rapid endwise removal of the broom assembly off said axle.

7. The combination of claim 6 in which the broom is generally annnular and defines a central axis the axle passes generally coaxially through the broom and said bodies support the broom against radial, rotary and axial displacement relative to the axle.

8. The combination of claim 7 in which the body driving and driven surfaces extend within a central hollow defined by the broom annulus.

9. The combination of claim 8 in which adjacent driven surfaces on each driven body define planes having intersections which terminate outwardly proximate the outer boundary of said hollow.

10. The combination of claim 7 including a sleeve on the axle and mounting one of said driving bodies, the sleeve having driven connection to the axle and being blocked against such axial displacement on the axle as would tend to separate said one driving body from the driven body having nesting relation therewith.

11. The combination of claim 10 in which the axle has protrusions from opposite ends of said hollow, and including bearing assemblies supporting said protrusions, and means including arms carrying said bearing assemblies and frame structure supporting the arms to pivot about a pivot axis parallel to but offset from the axle.

12. The combination as defined in claim 11 including a mobile sweeper vehicle providing said frame structure and orienting said pivot axis horizontally and generally forward of said axle.

13. The combination as defined in claim 11 including a drive for rotating said axle thereby to transmit rotation to the broom via said nesting bodies.

14. The combination of claim 11 in which one arm and bearing assembly have detachable connection to an end portion of the axle, said one bearing assembly retaining the sleeve in said blocked relation until detachment of said one arm and bearing assembly from said axle end portion permits removal of the sleeve off the axle thereby allowing demounting of the broom therefrom.

References Cited by the Examiner
UNITED STATES PATENTS

| | | | |
|---|---|---|---|
| 1,996,544 | 4/1935 | Justice | 15—183 |
| 3,142,079 | 7/1964 | Haracz | 15—77 |
| 3,233,274 | 2/1966 | Kroll | 15—340 |

CHARLES A. WILLMUTH, *Primary Examiner.*

E. L. ROBERTS, *Assistant Examiner.*